United States Patent [19]

Gittinger et al.

[11] Patent Number: 5,703,204
[45] Date of Patent: Dec. 30, 1997

[54] METHOD FOR REPROCESSING AQUEOUS EXTRACT SOLUTIONS OBTAINED IN THE PRODUCTION OF PA 6 OR COPOLYAMIDE

[75] Inventors: Andreas Gittinger; Claus Wulff; Heinrich Haupt; Karsten-Josef Idel, all of Krefeld, Germany

[73] Assignee: Bayer AG, Leverkusen, Germany

[21] Appl. No.: 650,384

[22] Filed: May 20, 1996

[30] Foreign Application Priority Data

May 31, 1995 [DE] Germany .................. 195 19 819.0

[51] Int. Cl.⁶ .................. C08F 6/00; C08G 69/14
[52] U.S. Cl. .................. 528/486; 528/310; 528/323; 528/481; 528/499
[58] Field of Search .................. 528/481, 499, 528/323, 486, 310

[56] References Cited

U.S. PATENT DOCUMENTS 4,053,457 10/1977 Cordes et al. .................. 528/323
5,077,381 12/1991 Dellinger .................. 528/323
5,218,080 6/1993 Dellinger .................. 528/323

FOREIGN PATENT DOCUMENTS

| 0 459 206 | 4/1991 | European Pat. Off. . |
| 0 608 454 | 8/1994 | European Pat. Off. . |
| A 882 461 | 6/1943 | France . |
| 25 01 348 | 7/1976 | Germany . |
| 27 32 328 | 2/1979 | Germany . |

*Primary Examiner*—P. Hampton-Hightower
*Attorney, Agent, or Firm*—Connolly and Hutz

[57] ABSTRACT

The invention relates to a method for recycling (reprocessing) aqueous extract solutions obtained in the production of polyamides. The method for reprocessing the aqueous extract solutions obtained consists in that the aqueous extract solution is concentrated and polymerised, adding small amounts of dicarboxylic acid or polycarboxylic acid to the extract solution.

10 Claims, No Drawings

METHOD FOR REPROCESSING AQUEOUS EXTRACT SOLUTIONS OBTAINED IN THE PRODUCTION OF PA 6 OR COPOLYAMIDE

FIELD OF THE INVENTION

The invention relates to a method for recycling (reprocessing) aqueous extract solutions obtained in the course of polyamide production. The method for reprocessing the aqueous extract solutions obtained consists in that the aqueous extract solution is concentrated and polymerised, adding small amounts of dicarboxylic acid or polycarboxylic acid to the extract solution.

BACKGROUND AND PRIOR ART

The process of polymerising $\epsilon$-caprolactam to polyamide 6 is not a complete reaction. The process leads to a state of equilibrium in which the polymer produced still contains extractable low-molecular components (below summarily designated by the term "extract". Hence the term "extract" designates the dry matter contained in the aqueous extract solutions). These extractable low-molecular components are substantially $\epsilon$-caprolactam and its oligomers. Basically the same applies to the production of copolyamides, which consist mainly of repeating units derived from caprolactam. The composition of the extract of these copolyamides is similar to that of the extract of polyamide 6.

The quantitative composition of the reaction mixture which is in a state of equilibrium depends on its temperature. For instance, $\epsilon$-caprolactam polymerised at 220° C. results in a polyamide 6 containing roughly 9% extract.

The aforementioned low-molecular components modify the characteristics of the polyamide in an undesirable manner. In polyamide 6 for instance, $\epsilon$-caprolactam acts as a plasticiser lowering the modulus of elasticity and the ultimate flexural stress. In addition, the extract interferes with the processing of the polyamide. In the course of injection moulding, for instance, it gives rise to mould deposits and in the course of extrusion to evaporation phenomena. Furthermore, the extract is eventually exuded from the polyamide and forms a deposit on the surface of the material.

With polyamide 6 and copolyamides containing a substantial proportion of monomeric units derived from $\epsilon$-caprolactam it is necessary therefore to remove low-molecular components after production. Technically this is achieved e.g. by continuous or discontinuous hot-water extraction (FR-A 882 461, DE-A 2 501 348, DE-A 2 732 328).

For reasons of economy the aqueous extract solution obtained in this manner is reprocessed. On the one hand, monomers are replaced as the extract is reprocessed, and on the other hand reprocessing makes it unnecessary to dispose of the extract as waste. Reprocessing can be effected e.g. by polymerising the extract concentrated by evaporation to polyamide 6 or copolyamides of polyamide 6 as is described in U.S. Pat. No. 4,053,057. At the same time polyamide-forming monomers may be added to the extract prior to polymerisation. These polyamide-forming monomers may be e.g. $\epsilon$- caprolactam or other lactams. However, the polyamide-forming monomers added may also be mixtures of dicarboxylic acid and diamines such as adipic acid and hexamethylene diamine. The extract is polymerised in accordance with the usual continuous or discontinuous methods for the production of polyamides.

EP-A 459 206, EP-A 608 454, U.S. Pat. No. 5,077,381 and U.S. Pat. No. 5,218,080 describe methods according to which the aqueous extract solution obtained in the course of producing polyamide 6 is subjected to a stage of hydrolysis at elevated temperature and elevated pressure prior to being returned for polymerisation.

The aforementioned methods for reprocessing the extract by polymerisation suffer from the disadvantage that the extract is polymerised more slowly than $\epsilon$-caprolactam. This results in lower throughputs during polymerisation than is the case with the polymerisation of $\epsilon$-caprolactam.

This has given rise to the object of developing an improved method for reprocessing the extract. The method is to enable reprocessing by polymerisation of the extract obtained in the course of production of polyamide 6 or of copolyamides of polyamide 6. At the same time the disadvantages resulting from the fact that polymerisation of the extract proceeds more slowly than that of $\epsilon$-caprolactam are to be reduced.

SUMMARY OF THE INVENTION

Surprisingly it has now been discovered that the addition of small amounts of dicarboxylic or polycarboxylic acid to the extract obtained in the course of producing polyamide 6 or copolyamides of polyamide 6 increases the rate of polymerisation. This result is surprising, since carboxylic acids are described as molecular-weight regulators in the production of polyamides. These molecular-weight regulators cause the molecular mass obtained in the process of polymerisation to be reduced. The rate of polymerisation may be defined as the molecular weight achieved after a certain period of polymerisation. It follows from this that the rate of polymerisation is reduced if molecular-weight regulators are used in the usual amounts.

The invention provides a method for reprocessing aqueous extract solutions obtained in the production of polyamide 6 or in the production of copolyamides consisting of not less than 70% by weight of repeating units derived from $\epsilon$-caprolactam, characterised in that the aqueous extract solution is concentrated, an amount of 0.02 to 20 mmol dicarboxylic acid or polycarboxylic acids per kg extract (dry matter) is added to the extract prior to, during or after concentration or in the process of polymerisation, and in that the polymerisation is effected optionally subject to the addition of polyamide-forming monomers.

DESCRIPTION OF PREFERRED EMBODIMENTS

Hence the invention provides a method for producing polyamide 6 or copolyamides containing not less than 70% by weight of repeating units derived from $\epsilon$-caprolactam, whereby aqueous extract solutions obtained in the course of producing polyamide 6 or copolyamides containing not less than 70% by weight of caprolactam repeating units are concentrated, an amount of 0.02 to 20 mmol dicarboxylic acid or polycarboxylic acid per kg extract (dry matter) is added to the extract solution prior to, during or after concentration or in the process of polymerisation, and in that the polymerisation is effected optionally subject to the addition of polyamide-forming monomers.

In order to concentrate the extract solution most of the water contained in it is distilled off. Preferably more than 90% of the water contained in the aqueous extract solutions is distilled off prior to polymerisation.

The remainder of solution water yet to be removed may be removed in the process of polymerisation. If the extract was polymerised while adding equimolar mixtures of diamines and dicarboxylic acids in order to produce copolyamides it is necessary in the process of polymerisation to remove from the reactor the reaction water resulting from polycondensation, in addition to any remaining solution water.

The dicarboxylic acids or polycarboxylic acids may be added to the extract prior to, during or after concentration of the extract or in the process of polymerisation. The dicarboxylic acids or polycarboxylic acids are preferably added after distilling off most of the solution water and prior to polymerisation.

The amount of dicarboxylic acids or polycarboxylic acids added to the extract may be 0.02 to 20 mmol dicarboxylic acids or polycarboxylic acids per kg extract (dry matter). Preferably 0.1 to 10 mmol and in particular 1 to 6 mmol dicarboxylic acids or polycarboxylic acids per kg extract are added to the extract. Preferably dicarboxylic acids are added. By way of dicarboxylic acids use may be made of aliphatic (preferably $C_6$–$C_{12}$) or aromatic dicarboxylic acids, with adipic acid, terephthalic acid or isophthalic acid but in particular adipic acid being preferred. By way of polycarboxylic acids use may be made of aliphatic or aromatic polycarboxylic acids. Trimesic acid is preferred.

The aqueous extract solution may be subjected to a stage of hydrolysis prior to or after the addition of the dicarboxylic acid or the polycarboxylic acids. The stage of hydrolysis may correspond to one of the methods described in EP-A 459 206, EP-A 608 454, U.S. Pat. No. 5,077,381 or U.S. Pat. No. 5,218,080 or a different method corresponding to the state of the art.

The extract may be used for producing polyamide 6 or copolyamide of polyamide 6. In order to produce copolyamides, polyamide-forming monomers are added to the extract. By way of polyamide-forming monomers, use may be made of lactams, aminocarboxylic acids or equimolar mixtures of diamines and dicarboxylic acids. The lactams added may e.g. be the lactam of 6-aminohexanoic acid (ε-caprolactam), the lactam of 11-aminoundecanoic acid, the lactam of 12-aminododecanoic acid or other conventional lactams. The aforementioned aminocarboxylic acids may also be added to the extract as such. Added equimolar mixtures of diamines and dicarboxylic acids may contain, by way of diamines, aliphatic or aromatic diamines such as hexamethylene diamine, 1.4-diaminobutane, isophorone diamine, xylylene diamine or other conventional diamines. Equimolar mixtures of diamines and dicarboxylic acids added may contain by way of dicarboxylic acid aliphatic or aromatic dicarboxylic acid such as adipic acid, sebacic acid, terephthalic acid, isophthalic acid or other conventional dicarboxylic acids. The extract is preferably used for producing polyamide 6. Per 10 parts by weight of extract preferably 0 to 90 parts by weight of polyamide-forming monomer, in particular ε-caprolactam or 6-aminohexanoic acid, are added to the extract during this process. Particularly preferred is the production of polyamide 6 from the extract subject to the addition of 1 to 10 parts by weight of ε-caprolactam per 10 parts by weight of extract.

Other conventional additives may be added to the extract prior to or in the process of polymerisation. These may be e.g. molecular-weight regulators such as monocarboxylic acids. Also other conventional additives such as stabilisers, nucleating agents, lubricants or fillers may be added prior to, during or after polymerisation.

The extract and its additives may be polymerised continuously or discontinuously. Polymerisation is preferably effected continuously e.g. in a precondensation pipe.

The polyamides produced according to the invention by the reprocessing of extract are suitable for the usual applications of polyamides. They may for instance be used to manufacture fibres, mouldings, semi-finished products or foils. The fibres, mouldings, semi-finished products or foils may be manufactured by spinning, injection moulding, extrusion, blow moulding or other conventional methods. In the course of such manufacturing processes conventional additives may be added to the polyamides produced according to the invention. By way of additives the following materials may for instance be added: fibrous or particulate fillers or reinforcing substances such as glass fibres, glass balls or mineral fillers. Furthermore, processing aids such as lubricants or nucleating agents may be added. Moreover flameproofing agents, stabilisers, impact-strength modifiers such as polyolefins or other rubbers may be added. Also colouring substances or other conventional additives may be added.

EXAMPLE

A mixture of 91 g aqueous extract of polyamide 6 concentrated to dryness and 10.43 g 6-aminohexanoic acid are polymerised subject to the addition of adipic acid in different concentrations. Polymerisation is effected subject to stirring for one hour at 200° C. under a nitrogen atmosphere and then for six hours at 270° C. The relative viscosity of the polymer thus obtained (determined in relation to a one-percent solution in meta-cresol at 25° C. using an Ubbellohde-viscometer) serves as a measure of the degree of polymerisation achieved in the given polymerisation period. The results are listed in the table below.

| Example No. | Addition of adipic acid in mmol per kg extract to be polymerised (dry matter*) | Relative viscosity of polymer |
| --- | --- | --- |
| 1 comparison | 0.0 | 3.08 |
| 2 | 1.5 | 3.38 |
| 3 | 3.0 | 3.41 |
| 4 | 4.5 | 3.35 |
| 5 | 6.0 | 3.26 |

*Determination of the dry matter contained in the extract solution by determining the water content according to Earl-Fischer.

The table shows that, all other polymerisation conditions being equal, the method according to the invention results in polyamides of higher relative viscosity i.e. higher molecular weight than polymerisation of the extract without any addition of adipic acid.

We claim:

1. A method for reprocessing aqueous extract solutions obtained in the production of polyamide 6 or copolyamides containing not less than 70% by weight of repeating units derived from ε-caprolactam, which comprises obtaining and concentrating an aqueous extract solution, and adding 0.02 to 20 mmol of dicarboxylic acid or polycarboxylic acids per kg extract (dry matter) to the extract prior to, during or after concentration.

2. A method as claimed in claim 1, further comprising polymerizing the aqueous extract solution, and wherein the dicarboxylic acid or polycarboxylic acids are added prior to, during or after concentration or during the, polymerization.

3. The method according to claim 2, wherein additional polyamide-forming monomers are added for polymerization.

4. A method according to claim 1, wherein 0.01 to 10 mmol of dicarboxylic or polycarboxylic acid are added.

5. A method according to claim 1, wherein 1 to 6 mmol dicarboxylic or polycarboxylic acid are added.

6. A method according to claim 1, wherein the dicarboxylic acids polycarboxylic acids are aliphatic or aromatic.

7. A method according to claim 6, wherein the dicarboxylic or polycarboxylic acids are selected from $C_6$–$C_{12}$-alkyldicarboxylic acids, terephthalic acid, isophthalic acid and trimesic acid.

8. A method according to claim 3, wherein the polyamide-forming monomers are lactams, aminocarboxylic acids or equimolar mixtures of diamines and dicarboxylic acids.

9. A method according to claim 3, wherein 0 to 90 parts by weight of polyamide-forming monomers per 10 parts by weight of extract (dry matter) are added to the extract.

10. In a process of reprocessing and polymerizing the aqueous extract solution from the production of polyamide 6 or copolyamides, the improvement which comprises increasing the rate of polymerization by addition of dicarboxylic acid or polycarboxylic acid to the extract.

* * * * *